US008370607B2

(12) United States Patent
Sun et al.

(10) Patent No.: US 8,370,607 B2
(45) Date of Patent: Feb. 5, 2013

(54) POWER EFFICIENT SYSTEM FOR RECOVERING AN ARCHITECTURE REGISTER MAPPING TABLE

(75) Inventors: Hong-Xia Sun, Beijing (CN); Kai-Feng Wang, Beijing (CN); Peng-Fei Zhu, Beijing (CN); Yong-Qiang Chris Wu, Beijing (CN)

(73) Assignee: STMicroelectronics (Beijing) R&D Co. Ltd. (CN)

( * ) Notice: Subject to any disclaimer, the term of this patent is extended or adjusted under 35 U.S.C. 154(b) by 625 days.

(21) Appl. No.: 12/645,767

(22) Filed: Dec. 23, 2009

(65) Prior Publication Data

US 2010/0169617 A1 Jul. 1, 2010

(30) Foreign Application Priority Data

Dec. 25, 2008 (CN) .......................... 2008 1 0242187

(51) Int. Cl.
*G06F 9/30* (2006.01)
(52) U.S. Cl. ........................................................ 712/220
(58) Field of Classification Search .................. None
See application file for complete search history.

(56) References Cited

U.S. PATENT DOCUMENTS 6,212,619 B1 4/2001 Dhong et al.

OTHER PUBLICATIONS

Wallace S. et al., "A scalable register file architecture for superscalar processors", Microprocessors and Microsystems, IPC Business Press Ltd. London, GB, vol. 22, No. 1, Jun. 1, 1998, pp. 49-60.
Lipasti MH et al., "Physical register inlining", Computer Architecture, 2004, Proceedings 31$^{st}$ Annual International Symposium on , Munchen, Germany, Jun. 19, 2004, pp. 325-335.
European Patent Office, Munich, Germany, EP 09180312.2-2211, Search Report, May 28, 2010.

*Primary Examiner* — Robert Fennema
(74) *Attorney, Agent, or Firm* — Leveque IP Law, P.C.

(57) ABSTRACT

A system for recovering an architecture register mapping table (ARMT). The system includes a first number of collection circuits and decode circuits, a second number of selection circuits, and an enable circuit. Information related to the mapping between each physical register and an appropriate architecture register is obtained from a physical register mapping table (PRMT) by one and only one collection circuit during only one of a fourth number of instruction cycles. Each decode circuit has its input coupled to the output of one different collection circuit and is capable of converting its input into a third number bit wide binary string selection code at its output. Each selection circuit is configured to receive from each selection code a bit from a bit position associated with that selection circuit. The enable circuit is configured to appropriately enable mapping of information from the PRMT to the ARMT.

20 Claims, 6 Drawing Sheets

PHYSICAL REGISTER ARRAY 110

ARCHITECTURE REGISTER ARRAY 120

PHYSICAL REGISTER MAPPING TABLE (PRMT) 140

| IPT1 | IPT2 | IPT3 | IPT4 | IPT5 | IPT6 | IPT7 | IPT8 | IPT9 | IPT10 | IPT11 | IPT12 | IPT13 | IPT14 | IPT15 | IPT16 |
|---|---|---|---|---|---|---|---|---|---|---|---|---|---|---|---|
| 0 | 0 | 5 | - | 1 | 25 | 0 | - | - | 0 | 0 | 0 | 0 | 0 | - | 0 |

| IPT17 | IPT18 | IPT19 | IPT20 | IPT21 | IPT22 | IPT23 | IPT24 | IPT25 | IPT26 | IPT27 | IPT28 | IPT29 | IPT30 | IPT31 | IPT32 |
|---|---|---|---|---|---|---|---|---|---|---|---|---|---|---|---|
| 0 | 0 | - | 0 | 0 | 0 | 0 | 0 | 25 | 0 | - | 0 | 0 | 0 | 6 | 0 |

| IPT33 | IPT34 | IPT35 | IPT36 | IPT37 | IPT38 | IPT39 | IPT40 | IPT41 | IPT42 | IPT43 | IPT44 | IPT45 | IPT46 | IPT47 | IPT48 |
|---|---|---|---|---|---|---|---|---|---|---|---|---|---|---|---|
| 0 | 0 | - | 0 | 0 | 7 | 1 | 0 | 0 | 0 | 0 | 0 | 0 | 0 | 0 | 0 |

| IPT49 | IPT50 | IPT51 | IPT52 | IPT53 | IPT54 | IPT55 | IPT56 | IPT57 | IPT58 | IPT59 | IPT60 | IPT61 | IPT62 | IPT63 | IPT64 |
|---|---|---|---|---|---|---|---|---|---|---|---|---|---|---|---|
| 0 | 0 | 0 | 0 | 0 | 3 | 0 | 0 | 0 | 0 | 12 1 | 0 | 0 | 0 | 0 | 0 |

ARCHITECTURE REGISTER MAPPING TABLE (ARMT) 150

| IAT1 | IAT2 | IAT3 | IAT4 | IAT5 | IAT6 | IAT7 | IAT8 | IAT9 | IAT10 | IAT11 | IAT12 | IAT13 | IAT14 | IAT15 | IAT16 |
|---|---|---|---|---|---|---|---|---|---|---|---|---|---|---|---|
| 5 | - | 38 | - | 3 | 15 | 22 | - | - | - | - | - | - | - | - | - |

| IAT17 | IAT18 | IAT19 | IAT20 | IAT21 | IAT22 | IAT23 | IAT24 | IAT25 | IAT26 | IAT27 | IAT28 | IAT29 | IAT30 | IAT31 | IAT32 |
|---|---|---|---|---|---|---|---|---|---|---|---|---|---|---|---|
| - | - | - | - | - | - | - | - | 9 | - | - | 59 | - | - | - | - |

POWER EFFICIENT SYSTEM FOR RECOVERING AN ARCHITECTURE REGISTER MAPPING TABLE

This application claims the benefit of Chinese Patent Application Ser. No. 200810242187.0 filed on Dec. 25, 2008, entitled "Power Efficient System for Recovering an Architecture Register Mapping Table" which is hereby incorporated by reference in its entirety herein.

BACKGROUND

Registers are special, high-speed storage devices used for processing data within a microprocessor of modern computers. Data or the address of the memory location where that data is located is stored in a register before the data is processed and the subsequent result of the processing or the address of the memory location where that result is located is also stored in a register. The number of registers that a microprocessor has and the number of bits that each register can store are two of various parameters that determine the power and speed of any given microprocessor. As an example, a 64-bit microprocessor is one in which each register is 64 bits wide meaning that each microprocessor instruction can manipulate up to 64 bits of data in any given instruction cycle as opposed to a 32-bit microprocessor which can only manipulate a maximum of 32 bits of data in any given instruction cycle.

Superscalar architecture microprocessors can execute more than one instruction per clock cycle. During execution, each of the concurrent instructions or groups of parallel instructions must use different registers. In such microprocessors, the concept of mapping physical registers is helpful in maintaining the separation between groups of registers. For each parallel processing set of instructions active on the microprocessor, each architecture register assigned to that process or program is mapped to a physical register. In addition, maintaining a physical register mapping table (PRMT) and an architecture register mapping table (ARMT), which records the mapping relationships between the physical registers and the architecture registers, enable faster operation. While the mapping information in the ARMT is also available in the PRMT, due to the smaller size of the ARMT the microprocessor can search the ARMT faster for the physical register number corresponding to the architecture register number than it could search the PRMT for the same information.

If an exception or branch misprediction does occur, entries in the ARMT must be recovered to their state just before that abnormal condition occurred. Since the PRMT contains more complete information than does the ARMT, the PRMT is first restored to its state just before the abnormal condition. Then, the ARMT is restored from information in the PRMT.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

As shown in the drawings for purposes of illustration, novel techniques are disclosed herein for a power efficient recovery system for the contents of an architecture register mapping table (ARMT) in the event an exception or branch misprediction occurs. If an exception or branch misprediction does occur, entries in the ARMT should be recovered to their state just before that abnormal condition occurred and should be restored by the information in the physical register mapping table (PRMT).

Previously, systems for recovering the ARMT have depended upon comparing each architecture register number with the appropriate field in each of the physical registers thereby recovering the entries in the ARMT in one instruction cycle. Because there could be more than one physical register mapped to the same architecture register, the search must also identify whether or not the physical register number was mapped into the architecture register at the time the exception or branch misprediction occurred. In a representative implementation, recovery is effected in the same cycle that the exception or branch misprediction occurs. Each architecture register number is compared with the architecture register number stored in or pointed to by each entry in the PRMT to find those entries that match that architecture register number. Because there may be more than one physical register mapped to the same architecture register, the comparison must also include an evaluation of whether or not the processor or program was using the related physical register during that recovery instruction cycle. As an example, for a microprocessor having 32 architecture registers and 64 physical registers, the recovery system will need up to two-thousand-forty-eight (2048) 5-bit comparators, thirty-two (32) 64-bit "AND" gates, and thirty-two (32) 6-bit encoders which will consume a large amount of dynamic power whenever a recovery of the ARMT is effected. In addition, even during non-recovery operations, the large number of comparators will consume a large amount of power due to leakage.

In the following detailed description and in the several figures of the drawings, like elements are identified with like reference numerals.

One type of microprocessor, the superscalar architecture, enables more than one instruction to be executed per clock cycle and uses both an ARMT and a PRMT to record the mapping relationships between the architecture registers and the physical registers. Architecture registers are used to more clearly and easily separate those physical registers being used by one instruction from those being used by another instruction executing during the same, given clock cycle. For each instruction active on the microprocessor, each architecture register assigned to that instruction is mapped to a physical register. Such information is stored in both the ARMT which maps architecture register numbers to physical register numbers and the PRMT which maps physical register numbers to architecture register numbers. While the mapping information in the ARMT is also available in the PRMT, due to the smaller size of the ARMT the microprocessor can search the ARMT faster for the physical register number corresponding to the architecture register number than it could search the PRMT for the same information.

If an exception or branch misprediction does occur, entries in the ARMT should be recovered to their state just before that abnormal condition occurred and should be restored by the information in the PRMT as the PRMT contains more complete information than does the ARMT. In superscalar microprocessors there are at least two pipeline stages, a fetch stage and a decode stage, before a register rename stage. If an exception or branch misprediction occurs, all three of these pipeline stages need to be flushed. In representative embodiments disclosed herein, advantage is taken of this feature of pipeline stages to recover the ARMT to its recovered state in three cycles. By recovering the ARMT in three cycles, only one-third of the ARMT must be recovered each cycle without the unnecessary loss of an instruction cycle. Thus, these representative embodiments are timing sufficient. Also, by decoding a field in the PRMT which identifies whether or not a given entry in the PRMT is assigned to the ARMT, each entry in the ARMT will be recovered at most only once in the complete ARMT restore process. The systems described herein for recovering the ARMT are not subject to the large leakage losses associated with the large numbers of comparators used in previous implementations. Thus, the present systems are more power efficient than the previous implementations. Further, power consumption of the ARMT recover process is divided into three cycles rather than the one cycle recovery process of previous implementations.

Figure 1:
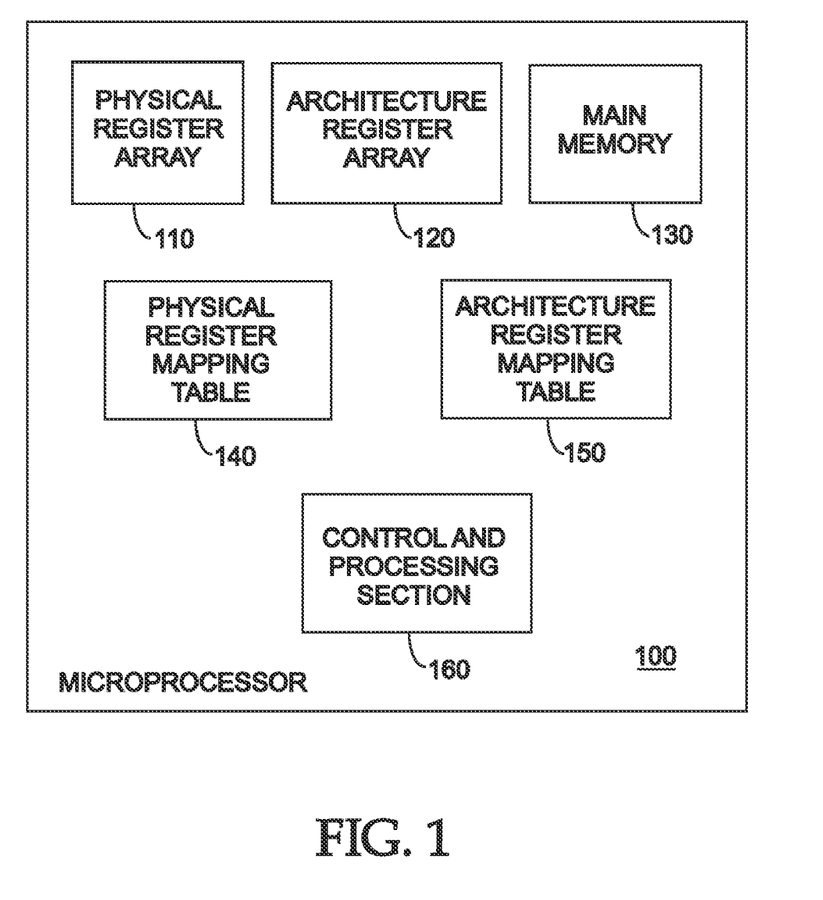
FIG. 1 is a block diagram of a superscalar microprocessor as described in various representative embodiments.

FIG. 1 is a block diagram of a superscalar microprocessor 100 as described in various representative embodiments. In the representative embodiment of FIG. 1, the microprocessor 100 comprises a physical register array 110, an architecture register array 120, a main memory 130, a physical register mapping table (PRMT) 140, an architecture register mapping table (ARMT) 150, and a control and processing section 160.

As indicated above physical registers 110 are special, high-speed storage devices used for processing data within a microprocessor 100 of modern computers. Data or the address of the memory location where that data is located is stored in a physical register 110 before the data is processed and the subsequent result of that processing or the address of the memory location where that result is located is also stored in a physical register 110. Architecture registers are used to more clearly and easily separate those physical registers being used by one instruction from those being used by another instruction executing during the same, given clock cycle. For each instruction active on the microprocessor, each architecture register assigned to that instruction is mapped to a physical register. Such information is stored in both the ARMT 150 which maps architecture register numbers to physical register numbers and the PRMT 140 which maps physical register numbers to architecture register numbers. The control and processing section 160 controls the flow of data and processing of that data. The control and processing section 160 is coupled to the physical register array 110, the architecture register array 120, the main memory 130, the PRMT 140, and the ARMT 150.

Figure 2:
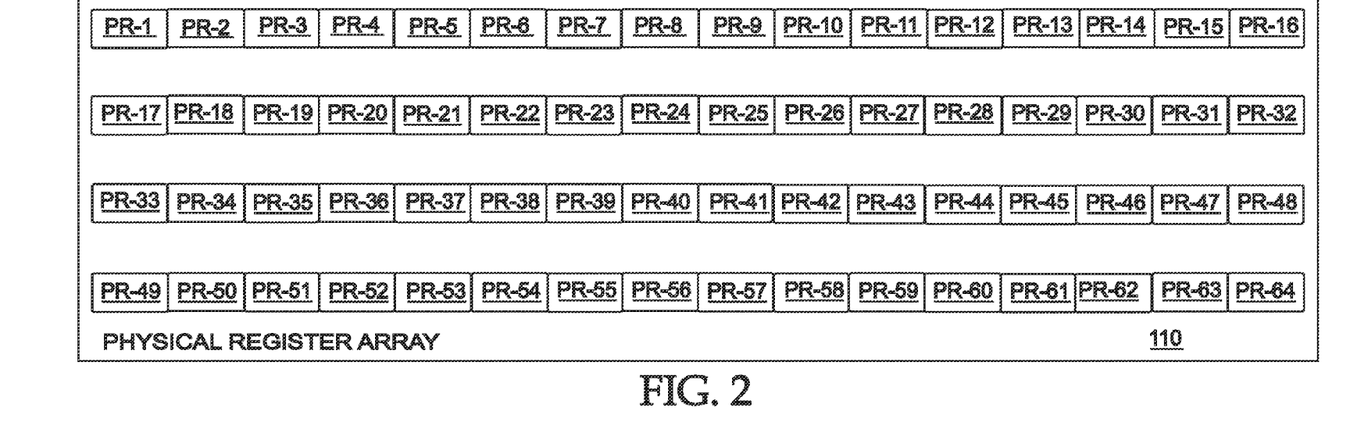
FIG. 2 is a block diagram of the physical register array of FIG. 1.

FIG. 2 is a block diagram of the physical register array 110 of FIG. 1. In the representative embodiment of FIG. 2, the physical register array 110 comprises 64 physical registers PR which are individually identified as a first physical register PR-1, a second physical register PR-2, a third physical register PR-3, ..., an i-th physical register PR-i, ..., a sixty-second physical register PR-62, a sixty-third physical register PR-63, and a sixty-fourth physical register PR-64.

Figure 3:
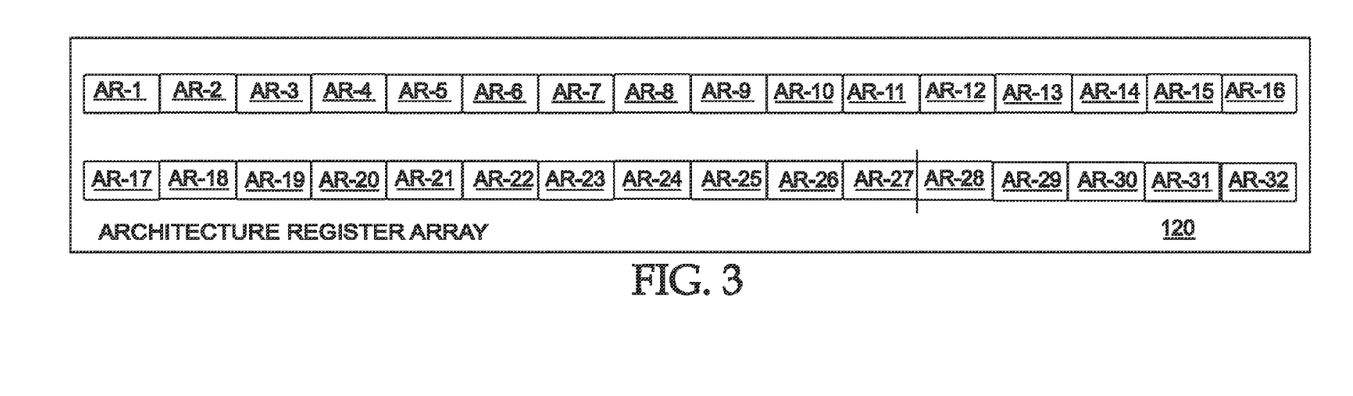
FIG. 3 is a block diagram of the architecture register array of FIG. 1.

FIG. 3 is a block diagram of the architecture register array 120 of FIG. 1. In the representative embodiment of FIG. 3, the architecture register array 120 comprises 32 architecture registers AR which are individually identified as a first architecture register AR-1, a second architecture register AR-2, a third architecture register AR-3, ..., a j-th architecture register AR-j, ..., a thirtieth architecture register AR-30, a thirty-first architecture register AR-31, and a thirty-second architecture register AR-32.

Figure 4:
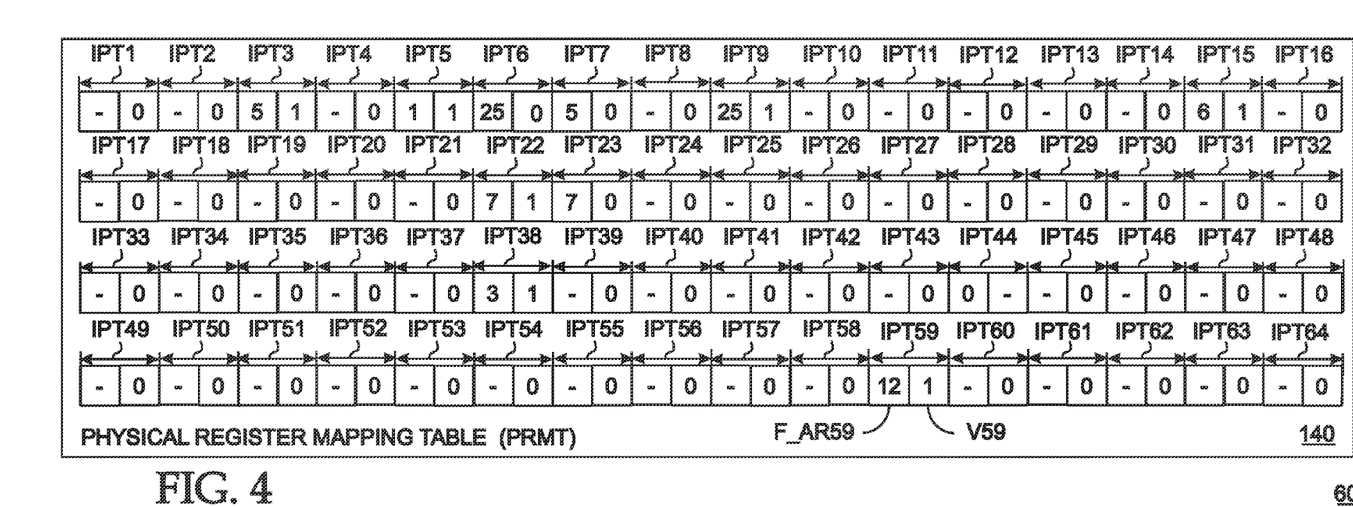
FIG. 4 is a block diagram of the physical register mapping table of FIG. 1.

FIG. 4 is a block diagram of the physical register mapping table 140 of FIG. 1. In the representative embodiment of FIG. 4, the physical register mapping table 140 comprises 64 physical register mapping entries accessed via 64 physical table indices IPT. The physical table indices IPT are individually identified in FIG. 4 as a first physical table index IPT1, a second physical table index IPT2, a third physical table index IPT3, ..., a k-th physical table index IPTk, ..., a sixty-second physical table index IPT62, a sixty-third physical table index IPT63, and a sixty-fourth physical table index IPT64. The value of the k-th physical table index IPTk is the number of the physical register assigned to that physical table index. Each of the physical register mapping entries accessed via the 64 physical table indices IPT comprises a physical table field F_AR for storing the architecture register number to which the physical register PR number identified by the physical table index IPT is mapped and a valid mapping field V for marking that physical table field F_AR as being valid for mapping to the indicated architecture register AR. Each of the physical table fields F_AR can be individually identified as a first physical table field F_AR1, a second physical table field F_AR2, a third physical table field F_AR3, ..., a m-th physical table field F_ARm, ..., a sixty-second physical table field F_AR62, a sixty-third physical table field F_AR63, and a sixty-fourth physical table field F_AR64. Each of the valid mapping fields V can be individually identified as a first valid mapping field V1, a second valid mapping field V2, a third valid mapping field V3, ..., a n-th valid mapping field Vn, ..., a sixty-second valid mapping field V62, a sixty-third valid mapping field V63, and a sixty-fourth valid mapping field V64. However, for clarity and ease of illustration only the fifty-ninth physical table field F_AR59 and its corresponding fifty-ninth valid mapping field V59 are specifically labeled in FIG. 4. Some physical table fields F_AR in FIG. 4 are shown with a "-" rather than a number as their particular values are not required by the discussion herein.

Figure 5:
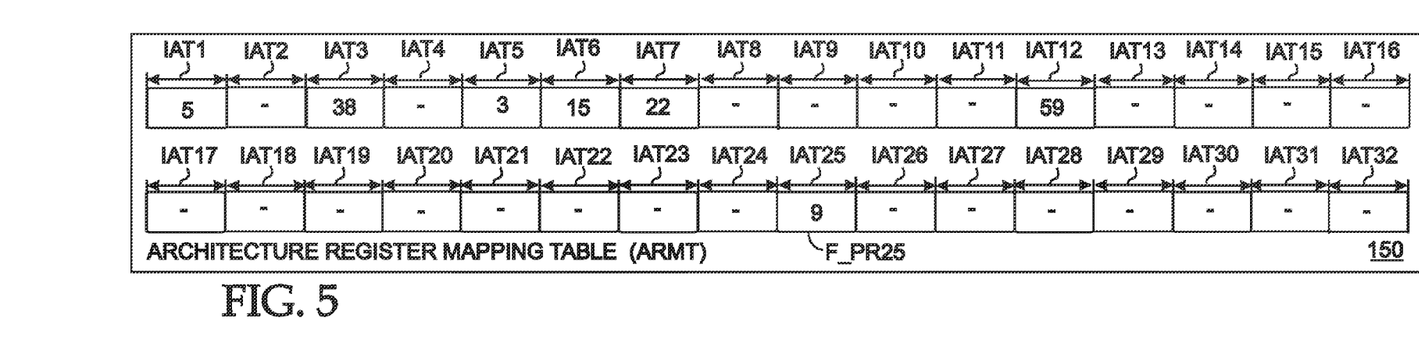
FIG. 5 is a block diagram of the architecture register mapping table of FIG. 1.

FIG. 5 is a block diagram of the architecture register mapping table 150 of FIG. 1. In the representative embodiment of FIG. 5, the architecture register mapping table 150 comprises 32 architecture register mapping entries accessed via 32 architecture table indices IAT. The architecture table indices IAT are individually identified in FIG. 5 as a first architecture table index IAT1, a second architecture table index IAT2, a third architecture table index IAT3, ..., a p-th architecture table index IATp, ..., a thirtieth architecture table index IAT30, a thirty-first architecture table index IAT31, and a thirty-second architecture table index IAT32. The value of the p-th architecture table index IATp is the number of the architecture register assigned to that ARMT index. Each of the architecture register mapping entries accessed via the 32 architecture table indices IAT comprises an architecture table field F_PR for storing the physical register number to which the architecture register number identified by the architecture table index IAT is mapped. Each of the architecture table fields F_PR can be individually identified as a first architecture table field F_PR1, a second architecture table field F_PR2, a third architecture table field F_PR3, . . . , a q-th architecture table field F_PRq, . . . , a thirtieth architecture table field F_PR30, a thirty-first architecture table field F_PR31, and a thirty-second architecture table field F_PR32. However, for clarity and ease of illustration only the twenty-fifth architecture table field F_PR25 is specifically labeled in FIG. 4. Also, some architecture table fields F_PR in FIG. 5 are shown with a "-" rather than a number as their particular values are not required by the discussion herein.

Note among other items that in the example of FIG. 5, the first architecture table field F_PR1 at the first architecture table index IAT1 in the ARMT 150 maps the first architecture register AR-1 to the fifth physical register PR-5, and that the fifth physical table field F_AR5 at the fifth physical table index IPT5 in the PRMT 140 maps the fifth physical register PR-5 to the first architecture register AR-1; the third architecture table field F_PR3 at the third architecture table index IAT3 in the ARMT 150 maps the third architecture register AR-3 to the thirty-eighth physical register PR-38, and that the thirty-eighth physical table field F_AR38 at the thirty-eighth physical table index IPT38 in the PRMT 140 maps the thirty-eighth physical register PR-38 to the third architecture register AR-3; and the sixth architecture table field F_PR6 at the sixth architecture table index IAT6 in the ARMT 150 maps the sixth architecture register AR-6 to the fifteenth physical register PR-15, and that the fifteenth physical table field F_AR15 at the fifteenth physical table index IPT15 in the PRMT 140 maps the fifteenth physical register PR-15 to the sixth architecture register AR-6.

Note that the sixth physical table field F_AR6 specifies architecture register number 25. However, the sixth valid mapping field V6 is a "0" which specifies that the sixth physical table field F_AR6 is not valid for entry into the ARMT 150 of FIG. 5. Whereas, the ninth physical table field F_AR9 also specifies architecture register number 25, and the ninth valid mapping field V9 is a "1" which specifies that the ninth physical table field F_AR9 is valid for entry into the ARMT 150 of FIG. 5.

Similarly the twenty-third physical table field F_AR23 specifies architecture register number 7. However, the twenty-third valid mapping field V23 is a "0" which specifies that the twenty-third physical table field F_AR23 is not valid for mapping into the ARMT 150 of FIG. 5. Whereas, the twenty-second physical table field F_AR22 also specifies architecture register number 7, and the twenty-second valid mapping field V22 is a "1" which specifies that the twenty-second physical table field F_AR22 is valid for mapping into the ARMT 150 of FIG. 5.

And as stated above, some physical table fields F_AR in FIG. 4 and architecture table fields F_PR in FIG. 5 are shown with a "-" rather than a number as their particular values are not required by the discussion herein.

Figure 6:
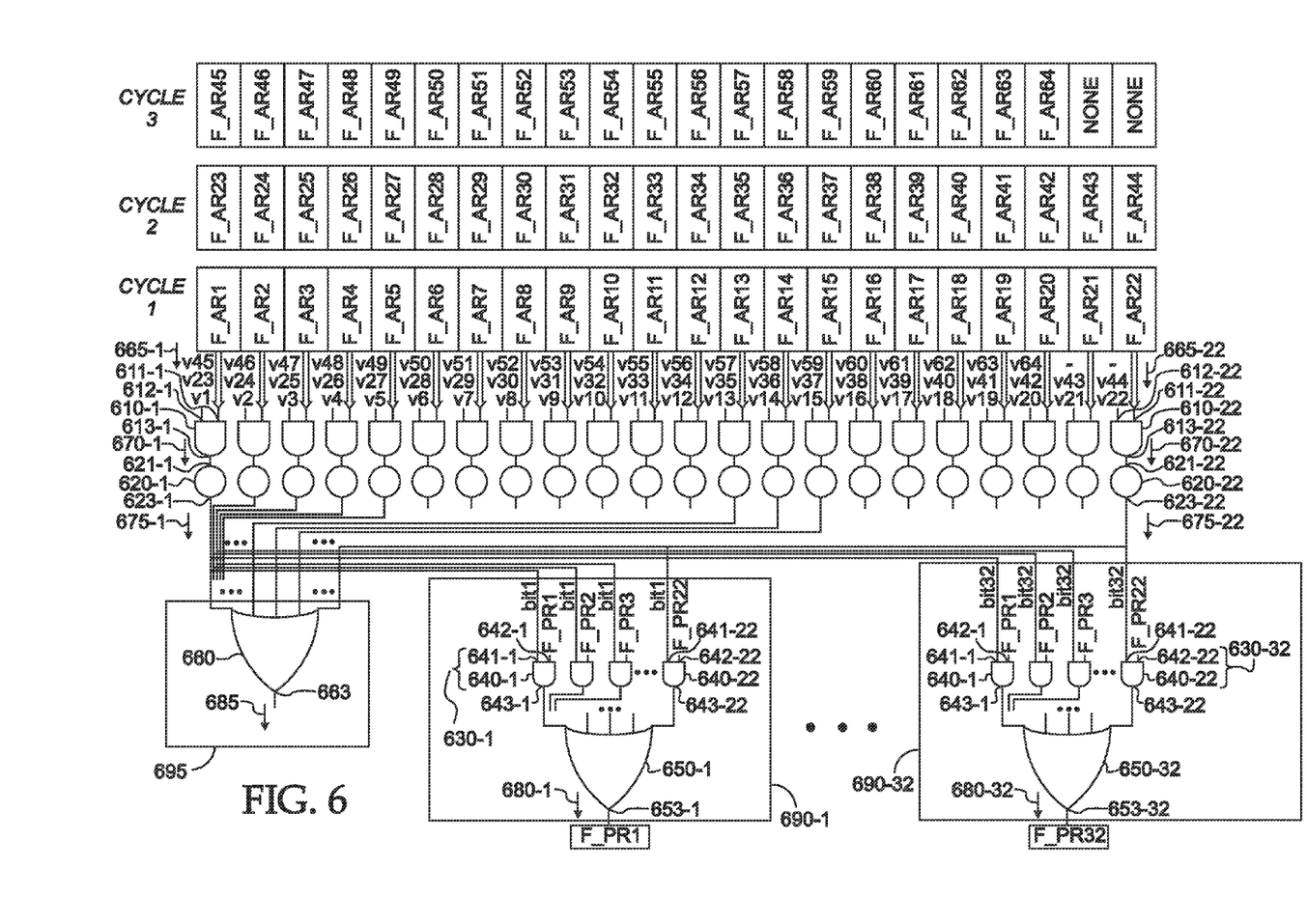
FIG. 6 is a drawing of a recovery system for recovering the architecture register mapping table of FIGS. 1 and 5.

FIG. 6 is a drawing of a recovery system 600 for recovering the architecture register mapping table 150 of FIGS. 1 and 5. In the representative embodiment of FIG. 6, the recovery system 600 comprises multiple first AND gates 610, multiple decoders 620 which in the implementation of FIG. 6 are 5-bit decoders, multiple sets 630 of second AND gates 640, multiple first OR gates 650, and a second OR gate 660. For clarity and ease of illustration, only two of the first AND gates 610 (the first first AND gate 610-1 and the twenty-second first AND gate 610-22) and two of the decoders 620 (the first decoder 620-1 and the twenty-second decoder 620-22) are specifically labeled in FIG. 6. Also, only two sets 630 (the first set 630-1 and the thirty-second set 630-32) of the second AND gates 640 and two associated first OR gates 650 (the first first OR gate 650-1 and the thirty-second first OR gate 650-32) are specifically shown and specifically labeled in FIG. 6. Further, only two of the second AND gates 640 (the first second AND gate 640-1 and the twenty-second second AND gate 640-22) in each set 630 (the first set 630-1 and the thirty-second set 630-32) of second AND gates 640 shown in FIG. 6 are specifically labeled in that figure.

In a more general embodiment, the recovery system 600 of FIG. 6 comprises multiple collection circuits 610 (which each replace one of the first AND gates 610) wherein each paired physical table field F_AR and valid mapping field V are coupled to only one of the collection circuits 610 during only one of the instruction cycles, multiple decode circuits 620 (which each replace one of the decoder circuits 620) wherein each decode circuit 620 has its input coupled to the output of a different collection circuit 610 and is capable of converting its input into a separate selection code 675 at its output wherein each selection code 675 specifies whether or not and to which architecture table field F_PR one of the physical table fields F_AR is to be mapped, multiple selection circuits 690 wherein the output of each decode circuit 620 is coupled to the input of a different selection circuit 690, and an enable circuit 695 configured to choose the appropriate architecture table fields F_PR to recover, wherein the output of each selection circuit 690 is coupled to a different architecture table field F_PR and is written into that architecture table field F_PR when permitted by the enable circuit 695.

The representative embodiment of FIG. 6 assumes that the microprocessor 100 has 64 physical registers PR and 32 architecture registers AR. However, these particular numbers of physical registers PR and architecture registers AR are representative only. In superscalar microprocessors 100, the number of physical registers PR is usually at least twice the number of architecture Registers AR so as to insure that there are enough physical registers PR for register renaming. But, the number of physical registers PR is not necessarily an integral multiple of the number of architecture registers AR.

In a superscalar microprocessor 100, there are at least two pipeline stages, a fetch stage and a decode stage, before a register rename stage. If an exception or branch misprediction does occur during the register rename stage, that register rename stage and the preceding fetch and decode stages should be flushed. The stage following the exception or branch misprediction will begin to fetch correct instructions but it will take these correct instructions three stages to again reach the rename stage. Thus, advantage can be taken of the features of pipeline stages by dividing recovery of the ARMT 150 into three cycles. And, the recover systems 600 disclosed in the representative embodiments herein can alleviate the timing pressure and spread the power consumption of the recovery of the ARMT 150 over three cycles. In other representative embodiments, however, the number of cycles used for recovery of the ARMT 150 can differ from the three disclosed herein.

In representative embodiments, the recovery system 600, separates the PRMT 140 into three parts. As shown in FIG. 6, for each of three cycles, approximately one-third (22 in each of two cycles and 20 in a third cycle) of the 64 physical table fields F_AR in the PRMT 140 are inputted into first AND gates 610 along with a code obtained from the valid mapping field V to obtain each of the valid architecture register AR numbers to be mapped to the ARMT 150. During the first cycle, the first twenty-two physical table fields F_AR1, . . . , F_AR22 are separately coupled via first AND gate input fields 665 to first AND gate first inputs 611 of the twenty-two different first AND gates 610, and the corresponding first twenty-two valid mapping fields V1, . . . , V22 are separately coupled to first AND gate second inputs 612 of their corresponding first AND gates 610. During the second cycle, the second twenty-two physical table fields F_AR23, . . . , F_AR44 are separately coupled via first AND gate input fields 665 to first AND gate first inputs 611 of the twenty-two different first AND gates 610, and the corresponding second twenty-two valid mapping fields V23, . . . , V44 are separately coupled to first AND gate second inputs 612 of their corresponding first AND gates 610. During the third cycle, the last twenty physical table fields F_AR45, . . . , F_AR64 are separately coupled via first AND gate input fields 665 to first AND gate first inputs 611 of the twenty different first AND gates 610, and the corresponding last twenty valid mapping fields V45, . . . , V64 are separately coupled to first AND gate second inputs 612 of their corresponding first AND gates 610. For clarity and ease of illustration only two first AND gate first inputs 611 (the first first AND gate first input 611-1 and the twenty-second first AND gate first input 611-22), only two first AND gate second inputs 612 (the first first AND gate second input 612-1 and the twenty-second first AND gate second input 612-22), and two of the first AND gate input fields 665 (the first first AND gate input field 665-1 and the twenty-second first AND gate input field 665-22) are specifically labeled in FIG. 6.

The first AND gate outputs 613 of the first AND gates 610 are separately coupled via first AND gate output codes 670 to separate decoder inputs 621. For clarity and ease of illustration only two first AND gate outputs 613 (the first first AND gate output 613-1 and the twenty-second first AND gate output 613-22), two decoder inputs 621 (first decoder input 621-1 and the twenty-second decoder input 621-22), and two of the first AND gate output codes 670 (the first first AND gate output code 670-1 and the twenty-second first AND gate output code 670-22) are specifically labeled in FIG. 6.

The decoder outputs 623 are separately coupled via decoder output codes 675 to corresponding separate second AND gate first inputs 641. For example, the first bits of the first through the twenty-second decoder outputs 623-1, . . . , 623-22 are coupled to the first second AND gate first input 641-1 through the twenty-second second AND gate first input 641-22 in the first set 630-1 of second AND gates 640, and the thirty-second bits of the first through the twenty-second decoder outputs 623-1, . . . , 623-22 are coupled to the first second AND gate first input 641-1 through the twenty-second second AND gate first input 641-22 in the thirty-second set 630-32 of second AND gates 640. For clarity and ease of illustration only two decoder outputs 623 (the first decoder output 623-1 and the twenty-second decoder output 623-22), four second AND gate first inputs 641 (the first second AND gate first input 641-1 of the first set 630-1 of second AND gates 640, the twenty-second second AND gate first input 641-22 of the first set 630-1 of second AND gates 640, the first second AND gate first input 641-1 of the thirty-second set 630-32 of second AND gates 640, and the twenty-second second AND gate first input 641-22 of the thirty-second set 630-32 of second AND gates 640), and two decoder output codes 675 (the first decoder output code 675-1 and the twenty-second decoder output code 675-22) are specifically labeled in FIG. 6.

The second AND gate second inputs 642 are separately coupled to corresponding separate architecture table fields F_PR values for mapping to the ARMT 150. Again, for each of three cycles, approximately one-third (22 in each of two cycles and 20 in a third cycle) of the 64 physical table fields F_AR in the PRMT 140 are coupled to their corresponding second AND gate second input 642 of their corresponding second AND gates 640 in each of the thirty-two sets 630 of second AND gates 640. During the first cycle, the first twenty-two physical table fields F_AR1, . . . , F_AR22 are separately coupled as just described; during the second cycle, the second twenty-two physical table fields F_AR23, . . . , F_AR44 are separately coupled as just described; and during the third cycle, the last twenty physical table fields F_AR45, . . . , F_AR64 are separately coupled as just described. For clarity and ease of illustration only four second AND gate second inputs 642 (the first second AND gate second input 642-1 of the first set 630-1 of second AND gates 640, the twenty-second second AND gate second input 642-22 of the first set 630-1 of second AND gates 640, the first second AND gate second input 642-1 of the thirty-second set 630-32 of second AND gates 640, and the twenty-second second AND gate second input 642-22 of the thirty-second set 630-32 of second AND gates 640) are specifically labeled in FIG. 6.

The second AND gate outputs 643 of each set 630 of second AND gates 640 are separately coupled to the inputs of their corresponding separate first OR gate 650. For clarity and ease of illustration, only four second AND gate outputs 643 (the first second AND gate output 643-1 of the first set 630-1 of second AND gates 640, the twenty-second second AND gate output 643-22 of the first set 630-1 of second AND gates 640, the first second AND gate output 643-1 of the thirty-second set 630-32 of second AND gates 640, and the twenty-second second AND gate output 643-22 of the thirty-second set 630-32 of second AND gates 640) are specifically labeled in FIG. 6. Also for clarity and ease of illustration, none of the inputs to the first OR gates are specifically labeled in FIG. 6.

The first OR gate outputs 653 are separately coupled via first OR gate output fields 680 to their corresponding separate architecture table fields F_PR. For clarity and ease of illustration, only two of the first OR gate outputs 653 (the first first OR gate output 653-1 and the thirty-second first OR gate output 653-32), two of the architecture table fields F_PR (the fist architecture table field F_PR1 and the thirty-second architecture table field F_PR32), and two first OR gate output fields 680 (the first first OR gate output field 680-1 and the thirty-second first OR gate output field 680-32) are specifically labeled in FIG. 6.

The twenty-two decoder outputs 623 are separately coupled to different inputs to the second OR gate 660 resulting in a 32-bit second OR gate output field 685 at the second OR gate output 663 which specifies by means of a "1" in appropriate bit locations those architecture table fields F_PR that will be recovered.

The first OR gates 650 provide only the values for the architecture table fields F_PR that might be recovered in the ARMT 150. Because the ARMT 150 is recovered in three cycles, each architecture table field F_PR in the ARMT 150 might be recovered in any of the three cycles, but it should be recovered only once. If an architecture table field F_PR is recovered in cycle 1, it should not be modified in the latter two cycles. However, in every recovery cycle, the first OR gates 650 will generate values for the 32 architecture table fields F_PR. As such, there should be an additional "valid" bit to tell whether the corresponding ARMT 150 entry should be modified to those values of architecture table fields F_PR. The second OR gate 660 is used to generate a 32-bit wide second OR gate output field 685 which is used to control modification of the 32 architecture table fields F_PR in the ARMT 150.

As an example, note that in FIG. 4, the third physical table field F_AR3 in the PRMT 140 is the number "5" and the third valid mapping field V3 is the number "1" which means that the fifth architecture register AR-5 is to be mapped to the third physical register PR-3 and vice versa. In an example implementation, Table 1 shows the lower 5-bits of the binary code, "00101", for the number 5 found in the third physical table field F_AR3 in the PRMT 140 of FIG. 4. During the first cycle, this code "00101" is inputted to the third first AND gate first input 611-3 of FIG. 6.

And further note that in FIG. 4, the seventh physical table field F_AR7 in the PRMT 140 is also the number "5" but that the seventh valid mapping field V7 is the number "0" which means that the fifth architecture register AR5 is not to be mapped to the seventh physical register PR-7 and vice versa. Again, Table 1 shows the lower 5-bits of a binary code, "00101", for the number 5 which is also found in the seventh physical table field F_AR7 in the PRMT 140. During the first cycle, this same code "00101" is also inputted to the seventh first AND gate first input 611-7 of FIG. 6.

TABLE 1

00101
The Lower 5-Bits Input to
the Third and the Seventh First AND Gates 610-3, 610-7 of FIG. 6

Since the third valid mapping field V3 is the number "1", the lower 5-bits output of the third first AND gate 610-3 of FIG. 6, is "00101" as shown in Table 2. However, since the seventh valid mapping field V7 is a "0", the lower 5-bits output of the seventh first AND gate 610-7 of FIG. 6, is "00000" as shown in Table 3.

TABLE 2

00101
Lower 5-Bits Output from
the Third First AND Gate 610-3 of FIG. 6

TABLE 3

00000
Lower 5-Bits Output from
the Seventh First AND Gate 610-7 of FIG. 6

It follows that the output code from the third decoder 620-3 is "0000 1000 0000 0000 0000 0000 0000 0000" as found in Table 4 when extended to 32-bits wide. And, the output code from the seventh decoder 620-7 is "0000 0000 0000 0000 0000 0000 0000 0000" as found in Table 5 when also extended to 32-bits wide. Note that there is a "1" in the fifth position of the output code from the 5-bit third decoder 620-3 indicating that the third physical register PR-3 referenced by position in the PRMT 140 is to be mapped to the fifth architecture register AR-5 referenced by position in the ARMT 150. However, there is a "0" in the output code from the 5-bit seventh decoder 620-7 indicating that the seventh physical register PR-7 referenced by position in the PRMT 140 is not to be mapped to the fifth architecture register AR-5 referenced by position in the ARMT 150.

TABLE 4

0000 1000 0000 0000 0000 0000 0000 0000
32-Bit Code Output from
the Third Decoder 620-3 of FIG. 6

TABLE 5

0000 0000 0000 0000 0000 0000 0000 0000
32-Bit Wide Output from
the Seventh Decoder 620-7 of FIG. 6

During every cycle of the ARMT 150 recovery process for the representative embodiment of FIG. 6, twenty-two (22) 5-bit decoders, twenty-two (22) 5-bit "AND" gates, seven-hundred-four (704) 6-bit "AND" gates, thirty-two (32) 6-bit "OR" gates, and twenty-two (22) 32-bit "OR" gates will be operational. Because "AND" gates and "OR" gates consume far less power than comparators, this ARMT recovery mechanism can save significant dynamic power. Further more, in normal cycles, these decoders, "AND" gates and "OR" gates also consume less leakage power than the numerous comparators in the traditional solution.

As such, the disclosed systems are more power efficient than prior solutions. They also can complete the task of recovering the ARMT within the time necessary to clear compromised instructions from the pipeline. Thus, the disclosed systems may also be referred to as timing sufficient.

Figure 7:
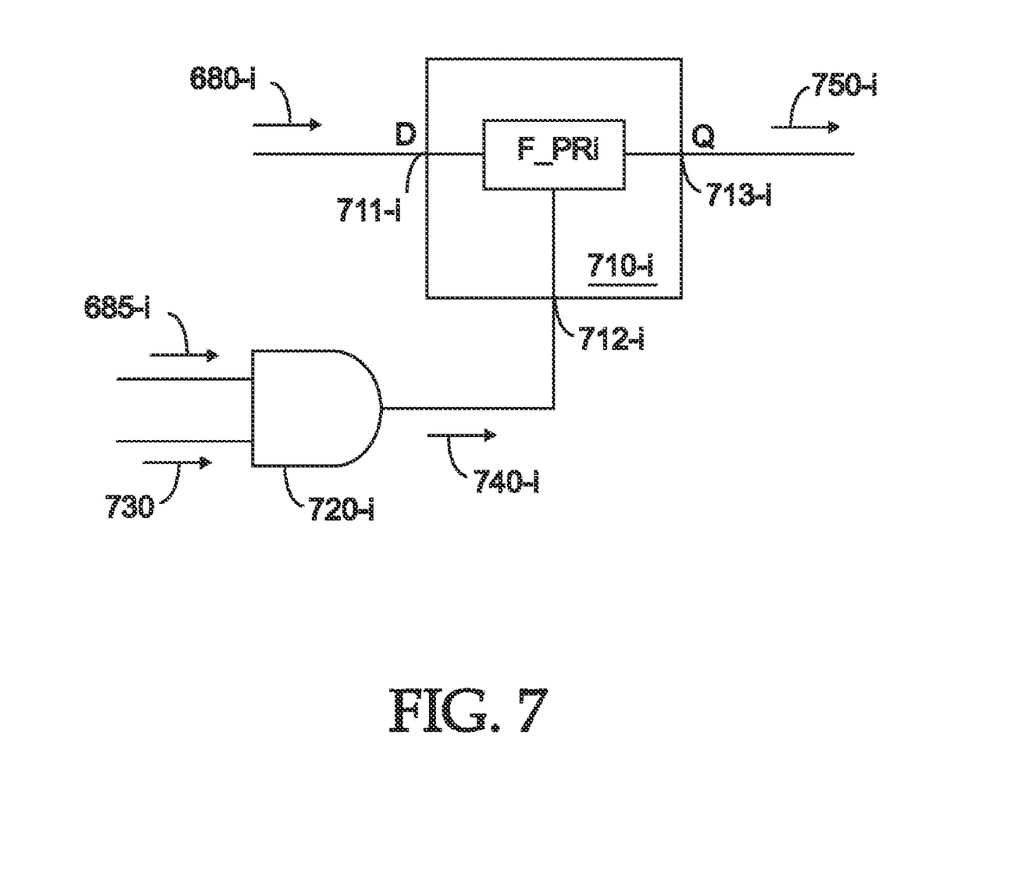
FIG. 7 is a block diagram of one of the architecture register mapping table registers for storing one of the architecture table fields in an implementation of the architecture register mapping table of FIG. 5.

FIG. 7 is a block diagram of one of the architecture register mapping table registers 710 for storing one of the architecture table fields F_PR in an implementation of the architecture register mapping table 150 of FIG. 5. In particular, the i-th architecture register mapping table (ARMT) register 710-*i* which stores the i-th architecture table field F_PRi is shown in FIG. 7. The architecture register mapping table registers 710 are also referred to herein as the ARMT registers 710, and the i-th architecture register mapping table (ARMT) 710-*i* is also referred to herein as the i-th ARMT register 710-*i*. The i-th ARMT register 710-*i* has i-th register write input 711-*i*, i-th write enable input 712-*i*, and i-th register output 713-*i*. For the i-th ARMT register 710-*i*, the i-th bit of the second OR gate output field 685-*i* is input to one input of an i-th third AND gate 720-*i*. Writing into the i-th architecture table field F_PRi from the i-th first OR gate output field 680-*i* at the "D" input (the i-th register write input 711-*i*) to the i-th ARMT register 710-*i* is enabled by a "1" in the i-th bit of the second OR gate output field 685-*i* and a clock pulse 730 also representing a "1" at the inputs to the i-th third AND gate 720-*i*. If the i-th third AND gate output signal 740-*i* is a "1" the i-th first OR gate output field 680-*i* writes a value into the i-th architecture table field F_PRi which then appears at the "Q" output (the i-th register output 713-*i*) of the i-th ARMT register 710-*i*. Otherwise, the value of the i-th architecture table field F_PRi remains the same and also appears at the "Q" output of the i-th ARMT register 710-*i*.

Figure 8:
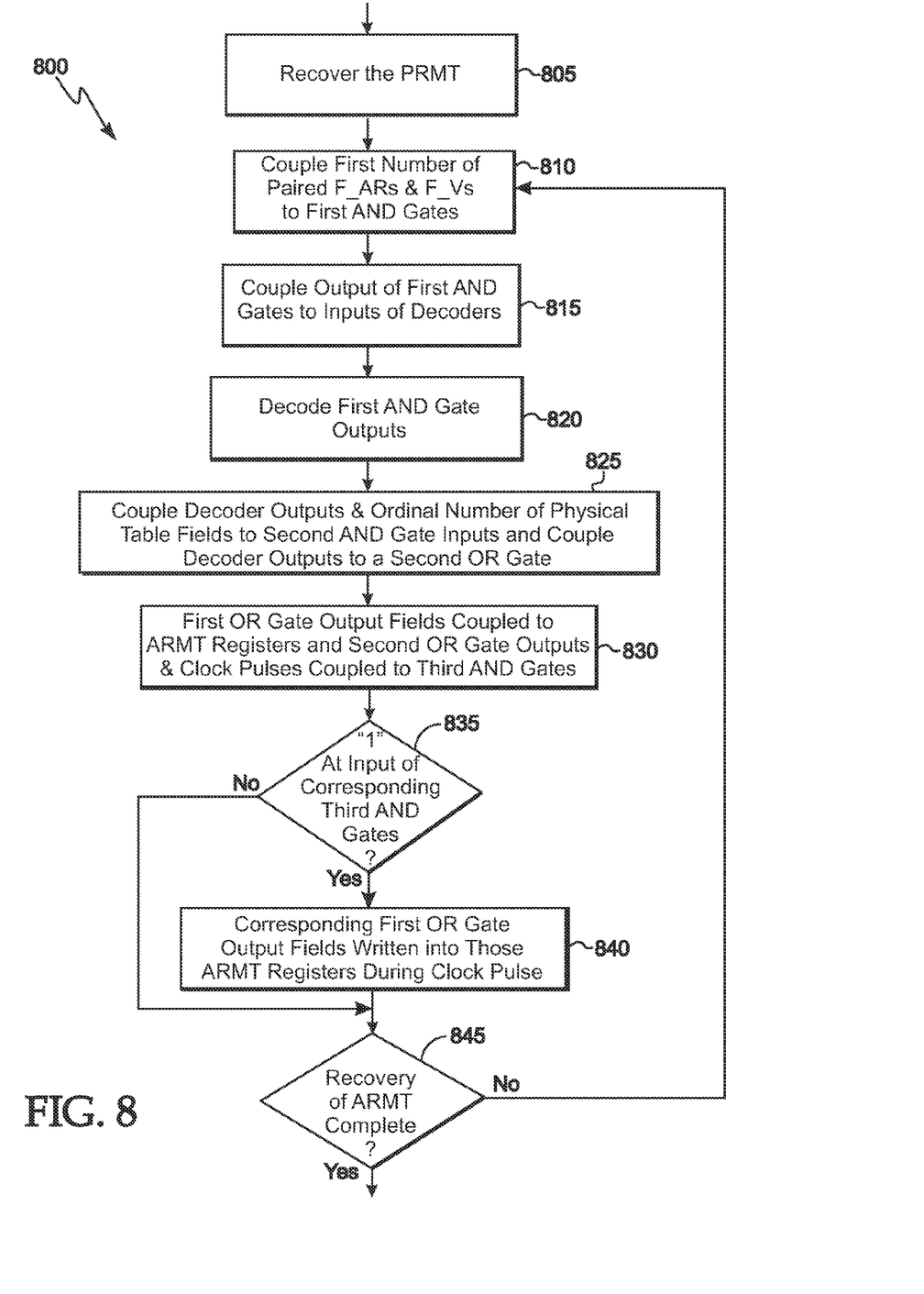
FIG. 8 is a flow chart of a method for recovering an architecture register mapping table as described in various representative embodiments.

FIG. 8 is a flow chart of a method 800 for recovering an architecture register mapping table 150 as described in various representative embodiments. In block 805 of FIG. 8, the PRMT 140 is recovered following an exception or branch misprediction. Block 805 then transfers control to block 810.

In block 810, each pair of a first number of physical table fields F_AR and valid mapping fields V from the PRMT 140 are coupled via first AND gate input fields 665 to the inputs of different first AND gates 610. Block 810 then transfers control to block 815.

In block 815, the outputs of the first number of first AND gates 610 are coupled via different first AND gate output codes 670 to the input of different decoders 620. Block 815 then transfers control to block 820.

In block 820, each of the inputs to the first number of decoders 620 is decoded by their respective decoder 620 into a decoder output code 675 at the output of that decoder 620. The decoder output codes 675 are each a second number wide linear array of bits. If a valid mapping field V has a "1" in it, its corresponding physical table field F_AR is decoded such that there is a "1" in the ordinal position corresponding to the ordinal number of the first AND gate 610 to which that physical table field F_AR was coupled and a "0" in all other positions. Otherwise, each position in the decoder output code 675 has a "0" in it. Block 820 then transfers control to block 825.

In block 825, corresponding ordinal numbered bits from each of the first number of decoder output codes 675, which are a second number of bits wide, are coupled separately to the inputs of similarly numbered first number of second AND gates 640 in each of a second number of sets 630 of second AND gates 640. The ordinal number of each of the physical table fields F_AR in the PRMT 140 being decoded (i.e., one of the F_PR) is coupled to the other second AND gate 640 inputs of the corresponding ordinal number of the second AND gates 640 in each set 630. The first number of decoder outputs 623 are separately coupled to different inputs to a second OR gate 660 resulting in a second number bit wide second OR gate output field 685 at the second OR gate output 663 which specifies, by means of a "1" in each bit location corresponding to an architecture table field F_PR, which architecture table fields F_PR will be recovered. Block 825 then transfers control to block 830.

In block 830, each ordinal first OR gate output field 680 is coupled to a corresponding ordinal ARMT register 710 input. Each ordinal bit of the second OR gate output field 685 is coupled to an input of an ordinal numbered third AND gate 720. And, a clock pulse 730 is coupled to the other input of each of the third AND gates 720. Block 830 then transfers control to block 835.

In block 835, for each ARMT register 710, if a "1" is present at the input of its corresponding third AND gate 720, block 835 transfers control to block 840. Otherwise, block 835 transfers control to block 845.

In block 840, for each ARMT register 710 wherein a "1" is present at the input of its corresponding third AND gate 720, the corresponding first OR gate output field 680 is written into that ARMT register 710 during the clock pulse. Block 840 then transfers control to block 845.

In block 845, if the recovery of the ARMT 150 is complete, block 845 terminates the process. Otherwise, block 845 transfers control back to block 810.

If an exception or branch misprediction does occur, entries in the ARMT 150 should be recovered to their state just before that abnormal condition occurred and should be restored by the information in the PRMT 140. In a representative embodiment, a system 600 for the power efficient recovery of the contents of an ARMT 150 in the event an exception or branch misprediction occurs has been disclosed. The system 600 disclosed herein recovers the ARMT 150 in three cycles and does not use comparators which consume significantly more dynamic and leakage power than do the "AND" and "OR" gates of the current system.

While the above representative embodiment has been described in terms of a 64-bit microprocessor and the ARMT 150 recovered in three instruction cycles, it will be understood by one of ordinary skill in the art that other representative embodiments can be implemented using different bit sizes for the microprocessor and the ARMT 150 can be recovered in a different number of instruction cycles.

In a representative embodiment, a system 600 for recovering an architecture register mapping table (ARMT) 150 is disclosed. The system 600 comprises a first number of collection circuits 610, a first number of decode circuits 620, a second number of selection circuits 690, and an enable circuit 695. The ARMT 150 includes a second number of architecture table fields F_PR each configured to enable mapping its associated architecture register AR to a physical register PR; a physical register mapping table (PRMT) 140 includes a third number of paired physical table fields F_AR and valid mapping fields V; each physical table field F_AR is configured to enable mapping its associated physical register PR to an architecture register AR if its associated valid mapping field V value permits such mapping; and each paired physical table field F_AR and valid mapping field V is coupled to one and only one collection circuit 610 during only one of a fourth number of instruction cycles. The first number of decode circuits 620 each has its input coupled to the output of one different collection circuit 610 and is capable of converting its input into a third number bit wide binary string selection code 675 at its output. Each selection code 675 specifies whether or not and to which architecture table field F_PR one of the physical table fields F_AR is be mapped. Each of the selection circuits 690 is configured to receive from each selection code 675 a bit from the bit position associated with that selection circuit 690. The enable circuit 695 is configured to choose the appropriate architecture table fields F_PR to recover, wherein the output of each selection circuit 690 is coupled to one different architecture table field F_PR and is written into that architecture table field F_PR when permitted by the enable circuit 695.

In another representative embodiment, a system 600 for recovering an architecture register mapping table (ARMT) 150 is disclosed. The system 600 comprises a first number of first AND gates 610, a first number of decoders 620, a first number of second AND gates 640 in each of a second number of sets 630, a second number of first OR gates 650, and a second OR gate 660. The ARMT 150 includes a second number of architecture table fields F_PR each configured to enable mapping its associated architecture register AR to a physical register PR; a physical register mapping table (PRMT) 140 includes a third number of paired physical table fields F_AR and valid mapping fields V; each physical table field F_AR is configured to enable mapping its associated physical register PR to an architecture register AR if its associated valid mapping field V value permits such mapping; and each paired physical table field F_AR and valid mapping field V is coupled to inputs of one and only one of the first AND gates 610 during only one of a fourth number of instruction cycles. Each of the first number of decoders 620 has its input coupled to the output of one different first AND gate 610 and is capable of decoding its input binary number into a third number bit wide binary string. Each set 630 is separately associated with a different bit position in the binary strings; for each set 630, each second AND gate 640 within that set 630 is separately associated with a separate binary string; in each set 630, one input to each second AND gate 640 is configured to receive the architecture table field F_PR associated with the physical table field F_AR coupled to the associated first AND gate 610 input; and another input to each second AND gate 640 in each set 630 is configured to receive from the binary string associated with that second AND gate 640 a bit from the bit position associated with that set 630 in the binary string. The second number of first OR gates 650 are each separately associated with a set 630 having inputs separately coupled to outputs of the second AND gates 640 in that set 630. The second OR gate 660 having inputs separately coupled to each decoder 620 output, and the output of each first OR gate 650 is coupled to and configured to write to one different architecture table field F_PR when so enabled by an associated ordinal bit of the output of the second OR gate 660.

In still another representative embodiment, a method 800 for recovering an architecture register mapping table (ARMT) 150 is disclosed. The method 800 comprises coupling each pair of a first number of physical table fields F_AR and valid mapping fields V from a physical register mapping table (PRMT) 140 via first AND gate input fields 665 to the inputs of different first AND gates 610, coupling the outputs of the first number of first AND gates 610 via different first AND gate output codes 670 to the input of different decoders 620, decoding each of the inputs to the first number of decoders 620 by their respective decoder 620 into a decoder output code 675 which is a second number wide linear array of bits, at the output of that decoder 620, coupling corresponding ordinal numbered bits from each of the decoder output codes 675 to the inputs of similarly numbered second AND gates 640 in each of a second number of sets 630 of second AND gates 640 and coupling the ordinal number of each of the physical table fields F_AR being decoded to the other second AND gate 640 input of each of the corresponding ordinal number of the second AND gates 640 in each set 630, coupling each ordinal first OR gate output field 680 to a corresponding ordinal ARMT register 710 input, coupling each ordinal bit of the second OR gate output field 685 to an input of an ordinal numbered third AND gate 720, and coupling a clock pulse 730 to the other input of each of the third AND gates 720; for each ARMT register 710, if a logic "1" is present at the input of its corresponding third AND gate 720, writing the corresponding first OR gate output field 680 into that ARMT register 710 during the clock pulse, and if the recovery of the ARMT 150 is incomplete, repeating each of the above steps.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A system for recovering an architecture register mapping table (ARMT), comprising:
   a first number of collection circuits,
      wherein the ARMT includes a second number of architecture table fields each configured to enable mapping a physical register to its associated architecture register,
      wherein a physical register mapping table (PRMT) includes a third number of paired physical table fields and valid mapping fields,
      wherein each physical table field is configured to enable mapping one of the architecture registers to its associated physical register if the associated valid mapping field value permits such mapping, and
      wherein each paired physical table field and valid mapping field is coupled to one and only one collection circuit during only one of a fourth number of instruction cycles;
   a first number of decode circuits each having its input coupled to the output of one different collection circuit and capable of converting its input into a third number bit wide binary string selection code at its output,
      wherein each selection code specifies whether or not and to which architecture table field one of the physical table fields is to be mapped;
   a second number of selection circuits,
      wherein each of the selection circuits is configured to receive from each selection code a bit from the bit position associated with that selection circuit; and
   an enable circuit configured to choose the appropriate architecture table fields to recover,
      wherein the output of each selection circuit is coupled to one different architecture table field and is written into that architecture table field when permitted by the enable circuit.

2. The system as recited in claim 1, wherein the PRMT is in a recovered state following an exception or branch misprediction.

3. The system as recited in claim 1, wherein the first number is twenty-two.

4. The system as recited in claim 1, wherein the third number is sixty-four.

5. The system as recited in claim 4, wherein the second number is thirty-two.

6. The system as recited in claim 5, wherein the fourth number is three.

7. The system as recited in claim 6, wherein the first number is twenty-two.

8. A system for recovering an architecture register mapping table (ARMT), comprising:
   a first number of first AND gates,
      wherein the ARMT includes a second number of architecture table fields each configured to enable mapping a physical register to its associated architecture register,
      wherein a physical register mapping table (PRMT) includes a third number of paired physical table fields and valid mapping fields,
      wherein each physical table field is configured to enable mapping one of the architecture registers to its associated physical register if the associated valid mapping field value permits such mapping, and
      wherein each paired physical table field and valid mapping field is coupled to inputs of one and only one of the first AND gates during only one of a fourth number of instruction cycles;
   a first number of decoders each having its input coupled to the output of one different first AND gate and capable of decoding its input binary number into a third number bit wide binary string;
   a first number of second AND gates in each of a second number of sets,
      wherein each set is separately associated with a different bit position in the binary strings,
      wherein for each set, each second AND gate within that set is separately associated with a separate binary string,
      wherein in each set, one input to each second AND gate is configured to receive the architecture table field associated with the physical table field coupled to the associated first AND gate input, and
      wherein another input to each second AND gate in each set is configured to receive from the binary string associated with that second AND gate a bit from the bit position associated with that set in the binary string;
   a second number of first OR gates each separately associated with one set having inputs separately coupled to outputs of the second AND gates in that set; and
   a second OR gate having inputs separately coupled to each decoder output,
      wherein the output of each first OR gate is coupled to and configured to write to one different architecture table field when so enabled by an associated ordinal bit of the output of the second OR gate.

9. The system as recited in claim 8, wherein the PRMT is in a previously recovered state following an exception or branch misprediction.

10. The system as recited in claim 8, wherein the first number is twenty-two.

11. The system as recited in claim 8, wherein the third number is sixty-four.

12. The system as recited in claim 11, wherein the second number is thirty-two.

13. The system as recited in claim 12, wherein the fourth number is three.

14. The system as recited in claim 13, wherein the first number is twenty-two.

15. The system as recited in claim 8, wherein each architecture table field in the ARMT is configured to associate one of the architecture registers to one of the physical register via ordinal placement of that architecture table field in the ARMT.

16. The system as recited in claim 8, wherein each physical table field in the PRMT is configured to associate one of the physical registers to one of the architecture registers via ordinal placement of that physical table field in the PRMT.

17. The system as recited in claim 8, wherein the decoders are 5-bit decoders configured to decode a 5-bit binary number at its input into a 32-bit wide string at its output having a "1" in the ordinal position of the string associated with the value of the 5-bit binary number.

18. The system as recited in claim 8, wherein each architecture table field in the ARMT is stored in a different architecture register mapping table (ARMT) register.

19. The system as recited in claim 18,
wherein the output of each first OR gate is coupled to the write input to one of the ARMT registers separately associated with that first OR gate,
wherein write enable input of each ARMT register is coupled to a separate third AND gate output,
wherein one of the inputs to each third AND gate is coupled to an ordinal bit position of the string output of the second OR gate associated with that third AND gate, and
wherein the other input to each third AND gate is coupled to a clock pulse.

20. A method for recovering an architecture register mapping table (ARMT), comprising:
coupling each pair of a first number of physical table fields and valid mapping fields from a physical register mapping table (PRMT) via first AND gate input fields to the inputs of different first AND gates;
coupling each output of the first number of first AND gates via different first AND gate output codes to the input of a different decoder;
decoding each of the inputs to the first number of decoders by their respective decoder into a decoder output code which is a second number wide linear array of bits, at the output of that decoder;
coupling corresponding ordinal numbered bits from each of the decoder output codes to the inputs of similarly numbered second AND gates in each of a second number of sets of second AND gates and coupling the ordinal number of each of the physical table fields being decoded to the other second AND gate input of each of the corresponding ordinal number of the second AND gates in each set;
coupling each ordinal first OR gate output field to a corresponding ordinal ARMT register input, coupling each ordinal bit of a second OR gate output field to an input of an ordinal numbered third AND gate, and coupling a clock pulse to the other input of each of the third AND gates;
for each ARMT register, if a logic "1" is present at the input of its corresponding third AND gate,
writing the corresponding first OR gate output field into that ARMT register during the clock pulse; and
if the recovery of the ARMT is incomplete, repeating each of the above steps.

* * * * *